United States Patent
Ishibashi

(10) Patent No.: US 8,042,695 B2
(45) Date of Patent: Oct. 25, 2011

(54) EXTERNAL PRESSURE TYPE HOLLOW FIBER MEMBRANE MODULE

(75) Inventor: Yuzuru Ishibashi, Fuji (JP)

(73) Assignee: Asahi Kasei Chemicals Corporation, Toyko (JP)

( * ) Notice: Subject to any disclaimer, the term of this patent is extended or adjusted under 35 U.S.C. 154(b) by 880 days.

(21) Appl. No.: 10/572,588

(22) PCT Filed: Sep. 28, 2004

(86) PCT No.: PCT/JP2004/014182
§ 371 (c)(1),
(2), (4) Date: Mar. 20, 2006

(87) PCT Pub. No.: WO2005/030375
PCT Pub. Date: Apr. 7, 2005

(65) Prior Publication Data
US 2007/0039868 A1    Feb. 22, 2007

(30) Foreign Application Priority Data
Sep. 29, 2003  (JP) ................................ 2003-338160

(51) Int. Cl.
*B01D 63/02*    (2006.01)

(52) U.S. Cl. ........... 210/500.23; 210/321.6; 210/321.72; 210/503; 210/650

(58) Field of Classification Search ............. 210/500.23, 210/503, 507, 508, 645, 646, 650, 651, 652, 210/653, 321.6, 321.61, 631.64, 321.71, 210/321.72, 321.78, 323.2, 338
See application file for complete search history.

(56) References Cited

U.S. PATENT DOCUMENTS 3,228,877 A * 1/1966 Mahon .......................... 210/638
5,013,331 A * 5/1991 Edwards et al. .................. 95/22
(Continued)

FOREIGN PATENT DOCUMENTS

JP  62-204804 A   9/1987
(Continued)

OTHER PUBLICATIONS

Definition of "up to", Merriam Webseter Online Dictionary, Accessed May 3, 2010, pp. 1-2.*

*Primary Examiner* — Tony G Soohoo
*Assistant Examiner* — David C Mellon
(74) *Attorney, Agent, or Firm* — Birch, Stewart, Kolasch & Birch, LLP

(57) ABSTRACT

An external pressure type hollow fiber membrane module, comprising a hollow fiber membrane bundle formed of a plurality of hollow fiber membranes, a housing, and an inlet/outlet nozzle for fluid, wherein hollow fiber membranes are fixedly adhered to each other and the hollow fiber membranes are fixedly adhered to the inner wall of the housing at both ends of the hollow fiber membrane bundle. The hollow part at one or both side adhesively-fixed ends is opened, and the inlet/outlet nozzle for fluid is installed at the side face of the housing at least at one adhesively-fixed end in which the hollow part is opened. Where the membrane occupied rates of the nozzle in a neighboring area (A) and a non-neighboring area (B) among membrane chargeable areas on the inside of the adhesively-fixed part at at least one adhesively-fixed end positioned near the nozzle and where the hollow part is opened are PA and PB, the ratio of the membrane occupied rates PB/PA is 0.50 to 0.95.

12 Claims, 10 Drawing Sheets

U.S. PATENT DOCUMENTS

| | | | |
|---|---|---|---|
| 5,176,725 A * | 1/1993 | Puri et al. | 96/8 |
| 5,234,591 A * | 8/1993 | Darnell et al. | 210/321.81 |
| 5,282,966 A * | 2/1994 | Walker | 210/321.8 |
| 5,837,033 A * | 11/1998 | Giglia et al. | 95/45 |
| RE36,125 E * | 3/1999 | Haworth et al. | 422/46 |
| 6,251,275 B1 * | 6/2001 | Rekers | 210/321.78 |
| 6,638,479 B1 * | 10/2003 | Elgas et al. | 422/45 |
| 7,153,473 B2 * | 12/2006 | Ericson et al. | 422/44 |
| 2002/0079260 A1 * | 6/2002 | Boivin et al. | 210/321.79 |
| 2002/0108906 A1 * | 8/2002 | Husain et al. | 210/636 |
| 2003/0080051 A1 * | 5/2003 | Aune et al. | 210/505 |
| 2004/0050788 A1 * | 3/2004 | Gorsuch et al. | 210/645 |
| 2008/0072754 A1 * | 3/2008 | Burban et al. | 96/8 |

FOREIGN PATENT DOCUMENTS

| | | | |
|---|---|---|---|
| JP | 4-58959 A | | 2/1992 |
| JP | 8-47624 A | | 2/1996 |
| JP | 9-220446 A | | 8/1997 |
| JP | 10-305218 A | | 11/1998 |
| JP | 2000-37616 A | | 2/2000 |
| JP | 2000-185220 A | | 7/2000 |
| JP | 2006247649 A | * | 9/2006 |
| JP | 2007216176 A | * | 8/2007 |

* cited by examiner

EXTERNAL PRESSURE TYPE HOLLOW FIBER MEMBRANE MODULE

TECHNICAL FIELD

The present invention relates to an external pressure type hollow fiber membrane module used in a filtering device for clarifying a large quantity of raw water such as river water, lake water, underground water, sea water, domestic wastewater and industrial wastewater and eliminating bacteria included therein.

BACKGROUND ART

In general, a hollow fiber membrane module is classified broadly into an internal pressure type and an external pressure type. The external pressure type of hollow fiber membrane module normally has a structure of bundling several hundreds to tens of thousands of hollow fiber membranes with a length of 200 to 3,000 mm and an outside diameter of the membrane of 0.1 to 5 mm, accommodating the bundle in a cylindrical case, and adhesively fixing the ends of both sides to an inner wall of the case with a resin. When adhesively fixing both ends, there are an one-end collection type module and a both-ends collection type module: the former is formed so as to have the end of the hollow fiber membrane opened in one adhesively-fixed part, have the hollow part of fiber membrane sealed at the other adhesively-fixed part, supply compressively raw water to a region sandwiched between the adhesively-fixed parts to permeate through the hollow fiber membrane, and take the filtrate out from the adhesively-fixed part in which the end of the hollow fiber is opened; and the latter is formed so as to have the ends of the hollow fiber membrane opened in both adhesively-fixed parts, and take the filtrate out from both ends. Furthermore, there are a plurality of through-holes in hollow fiber membrane bundles at the adhesively-fixed part that becomes to be a lower side when being used, and their ports are used as a port for supplying raw water to be filtrated, and as an air supply port and a cleaning waste water outlet in a physical cleaning process.

When such an external pressure type hollow fiber membrane module is used for the purpose of bacteria eliminating and clarification, it is normally subjected to a cross flow filtration to prevent a suspended solid from depositing on the surface of a hollow fiber membrane, or to the periodic physical cleaning such as a back wash reverse filtration and an air bubbling to recover a filter performance, thereby enabling a stable filtration operation. In order to operate the module in the above method, the module has an exhaust port provided at the side face of a case in the vicinity of an adhesively-fixed part in an upper part, and is vertically installed. When the module is used for filtration, the raw water containing the suspended solid is supplied from a through-hole provided in the adhesively-fixed part in the lower part, and the concentrated water is discharged from the exhaust port provided in the side face in the upper part of the case. In addition, in a cleaning step by air bubbling, the module is cleaned by the steps of supplying air from the through-hole in the lower part; thereby forming an air/water mixture flow; making the membrane oscillated by the air/water mixture flow; thereby stripping off the suspended solid deposited on the surface of a membrane; then supplying raw water together with air; and discharging it from the exhaust port provided at the side face in the upper part of the case.

The flow of a liquid discharged from the exhaust port in such a cross flow filtration and an air bubbling cleaning occasionally draws the hollow fiber membrane into the exhaust port to damage it, and the oscillation of the membrane occasionally makes stress concentrated in the vicinity of the inner surface of an adhesively-fixed part to rupture the hollow fiber membrane.

In order to efficiently discharge a deposit outside a module by exfoliating it from the surface of a membrane by the physical cleaning as described above, a space must be secured between hollow fibers, so that the hollow fiber membrane cannot be accommodated in the module having approximately the closest packed state, as in the case of an internal pressure type module. For this reason, a membrane-occupying rate in a housing is normally set at 0.3 to 0.6. The "membrane-occupying rate in a housing" used herein means a ratio of a total of the cross-sectional areas based on the outside diameter of the membrane with reference to the cross-sectional area based on the inside diameter of the housing in a filtration region of the membrane. When the membrane is accommodated in a comparative low density, the distribution of the membrane in an adhesively-fixed part of the membrane easily tends to be ununiform, and the hollow fiber membrane in the vicinity of the inner surface of the above adhesively-fixed part develops a strong tendency to be ruptured.

As the means of preventing the above damage/rupture of a membrane in the vicinity of the adhesively-fixed part of the hollow fiber membrane, a method has been known which installs a current cylinder in the vicinity of the inner surface of the adhesively-fixed part and arranges a layer of a high polymer material having rubber-like elasticity in the inner side of the adhesively-fixed part (for instance, see Patent Document 1). A method is also proposed which coats the surface of the hollow fiber membrane extending in the inner side of the adhesively-fixed part with the same adhesive as that for forming the inner surface of the fixed part (for instance, see Patent Document 2).

However, the method according to Patent Document 1 has an excellent effect in preventing the damage/rupture of a membrane as described above, but when forming an adhesively-fixed layer only with a high polymer having rubber-like elasticity, this may cause the problem that the adhesively-fixed part may be ruptured because the pressure resistance of the part is inferior. In addition, in order to secure the pressure resistance, it is required to adhesively fix the membrane with a material having high strength and high elasticity, and then to form a layer of a rubber-like elastic body on the inner side thereof, so that the method has a disadvantage of needing a complicated manufacturing process and a high cost.

On the other hand, the method according to Patent Document 2 does not have a sufficient effect of preventing the membrane from being ruptured, and causes the problem that the membrane is ruptured by air bubbling in a long term operation.

Patent Document 1: JP-A-09-220446
Patent Document 2: JP-A-10-305218

DISCLOSURE OF THE INVENTION

Problem to be Solved by the Invention

An object of the present invention is to provide an external pressure type hollow fiber membrane module which can efficiently discharge a deposit on a membrane surface outside a module, can be used for a long period without any rupture of a membrane in the vicinity of the inner side of an adhesively-fixed part caused by the flow of fluid, and can be easily manufactured.

Means for Solving the Problem

As a result of a diligent study for solving the above problems, the present inventors have found that the above object can be achieved by controlling the distribution of a membrane on the inner side of an adhesively-fixed part, and thus have accomplished the present invention on the basis of the finding.

Specifically, the present invention will be described below.

(1) An external pressure type hollow fiber membrane module including a hollow fiber membrane bundle formed of a plurality of hollow fiber membranes, a housing, and a nozzle for allowing a fluid to enter and exit therefrom, which makes the hollow fiber membranes fixedly adhered to each other and to the inner wall of the housing at both ends of the hollow fiber membrane bundle; makes a hollow part opened in one side or both sides of adhesively-fixed ends; and has the nozzle for allowing a fluid to enter and exit therefrom installed on the side face of the housing of at least one adhesively-fixed end at which the hollow part is opened; wherein a ratio PB/PA of membrane-occupying rates is 0.50 or more but 0.95 or less, when each of PA and PB is defined as the membrane-occupying rates in neighboring region (A) of the nozzle and non-neighboring region (B) of the nozzle among a membrane chargeable region in the inner side of an adhesively-fixed part, in at least one adhesively-fixed end of the opened hollow part in the vicinity of the nozzle.

(2) An external pressure type hollow fiber membrane module including: a hollow fiber cartridge having a hollow fiber membrane bundle formed of a plurality of hollow fiber membranes, of which both end parts are adhesively fixed and hollow parts in at least one of adhesively-fixed ends are opened; and a housing accommodating the cartridge and having a nozzle for allowing a fluid to enter and exit therefrom installed on at least one side face, in which the nozzle installed is fixed so as to be placed in the vicinity of the inner surface of an adhesively-fixed part in the opened hollow parts side in the hollow fiber membrane cartridge; wherein a ratio PB/PA of membrane-occupying rates is 0.50 or more but 0.95 or less, when each of PA and PB is defined as the membrane-occupying rate in neighboring region (A) of the nozzle and non-neighboring region (B) of the nozzle among a membrane chargeable region in the inner side of the adhesively-fixed part, in the adhesively-fixed end in the vicinity of the nozzle.

(3) The external pressure type hollow fiber membrane module according to (1) or (2), wherein in neighboring region (A) of the nozzle among the membrane chargeable region in the inner side of an adhesively-fixed part, membrane-occupying rate PC in every unit region (C) constituting neighboring region (A) is 0.5 times or more but 2.0 times or less with reference to membrane-occupying rate PA in neighboring region (A).

(4) The external pressure type hollow fiber membrane module according to (1) or (2), wherein PA, PB1 and PB2 of the membrane-occupying rates have the relation of PA≧PB1≧PB2 and further PA is 0.40 or more but 0.60 or less and PB2 is 0.20 or more but less than 0.40 when each of PB1 and PB2 is defined as a membrane-occupying rate in a first non-neighboring region (B1) and a second non-neighboring region (B2) in the non-neighboring region (B) of the nozzle among the membrane chargeable region in the inner side of the adhesively-fixed part.

(5) The external pressure type hollow fiber membrane module according to any one of (1) to (3), wherein the non-neighboring region (B) of a nozzle among the membrane chargeable region in the inner side of the adhesively-fixed part includes at least one unit region in which membrane-occupying rate PC in unit region (C) constituting the non-neighboring region (B) is less than 0.5 times with reference to membrane-occupying rate PB in the non-neighboring region (B).

(6) The external pressure type hollow fiber membrane module according to claim 1 or 2, wherein a current plate is arranged in the vicinity of the nozzle of outer circumference parts of the hollow fiber membrane bundle.

(7) The external pressure type hollow fiber membrane module according to claim 6, wherein the current plate is cylindrical, accommodates the hollow fiber membrane bundle inside of it, has a plurality of through-holes in a wall surface except the vicinity of the nozzle, and has no through-hole in the vicinity of the nozzle.

(8) The external pressure type hollow fiber membrane module according to claim 1 or 2, wherein an adhesive bond part constituting the adhesively-fixed part is made of a single layer of a high polymer material, and has the hardness of 50A to 70D in a range of operating temperatures.

(9) A method for manufacturing the external pressure type hollow fiber membrane module according to claim 1 or 2 including: previously inserting a plurality of columnar materials into an end of a hollow fiber membrane bundle at least in a side of making a hollow part opened; accommodating the hollow fiber membrane bundle which keeps the state of the insertion in a vessel for forming an adhesively-fixed part; injecting an adhesive bond into the vessel and curing it; then cutting an end face of the hollow fiber membrane bundle to form the adhesively-fixed part; and consequently making the columnar materials having a length of 0.3 to 0.9 times with reference to a thickness of the adhesively-fixed part exist at least in the adhesively-fixed part of neighboring region (A).

(10) A method for manufacturing the external pressure type hollow fiber membrane module according to claim 1 including: accommodating a hollow fiber membrane bundle in a housing case having a nozzle for allowing a fluid to enter and exit therefrom at least on one side face; horizontally rotating the housing case in a state of keeping the nozzle directing toward a lower direction than a horizontal direction; injecting an adhesive bond into the housing case under the centrifugal force; and curing it to form an adhesively-fixed part.

Effect of the Invention

An external pressure type hollow fiber membrane module according to the present invention can sufficiently discharge a deposit formed on a membrane surface by a physical cleaning technique, and hardly causes the rupture of a membrane in the vicinity of the inner side of an adhesively-fixed part even when a filtration with harsh physical cleaning including air bubbling has been operated for a long period, and further can be easily manufactured.

BEST MODE FOR CARRYING OUT THE INVENTION

The present invention will be specifically described below with a particular emphasis on a preferred embodiment thereof.

In the external pressure type membrane module according to the present invention, it is important that a ratio PB/PA of membrane-occupying rate PA in neighboring region (A) of a nozzle among a membrane chargeable region on at least an inner side of an adhesively-fixed part with reference to a membrane-occupying rate PB in a non-neighboring region (B) of the nozzle among the membrane chargeable region satisfies the range of 0.50 or more but 0.95 or less. When PB/PA is in the range, the fluid containing a deposit on a membrane easily flows outside a membrane bundle from the non-neighboring region, the fluid in the neighboring region does not flow intensively, and thus the damage or the rupture in the membrane is hardly caused. When PB/PA is less than 0.50, the density of the membranes which exist in non-neighboring region (B) of the nozzle is too few to relatively form the extreme nondense state, and thus the fluid intensively flows therethrough, thereby developing a tendency to damage/rupture the membrane in the region (B). On the other hand, when the PB/PA ratio exceeds 0.95, the membrane module reduces the effect of preferentially discharging a deposit on a membrane from the non-neighboring region. Furthermore, when the PB/PA ratio exceeds 1.0, the density of the membranes which exist in neighboring region (A) is too few to relatively form the extreme nondense state, and thus the flow rate there becomes to be remarkably high, thereby developing a tendency to damage/rupture the membrane in region (A). The PB/PA ratio is preferably 0.60 or more and 0.90 or less, and further preferably 0.7 or more and 0.90 or less.

In addition, when dividing a non-neighboring region into a first non-neighboring region (B1) and a second non-neighboring region (B2) and defining a membrane-occupying rate in each region as PB1 and PB2, the membrane-occupying rates preferably satisfy PA≧PB1≧PB2, and it is particularly preferable that PA is 0.40 or more but 0.60 or less and PB2 is 0.20 or more but less than 0.40. When the membrane-occupying rates satisfy these conditions, the membrane module adequately discharges a deposit on a membrane surface from a membrane bundle, and can prevent the membrane from being damaged or ruptured by a fluid flow.

Figure 1:
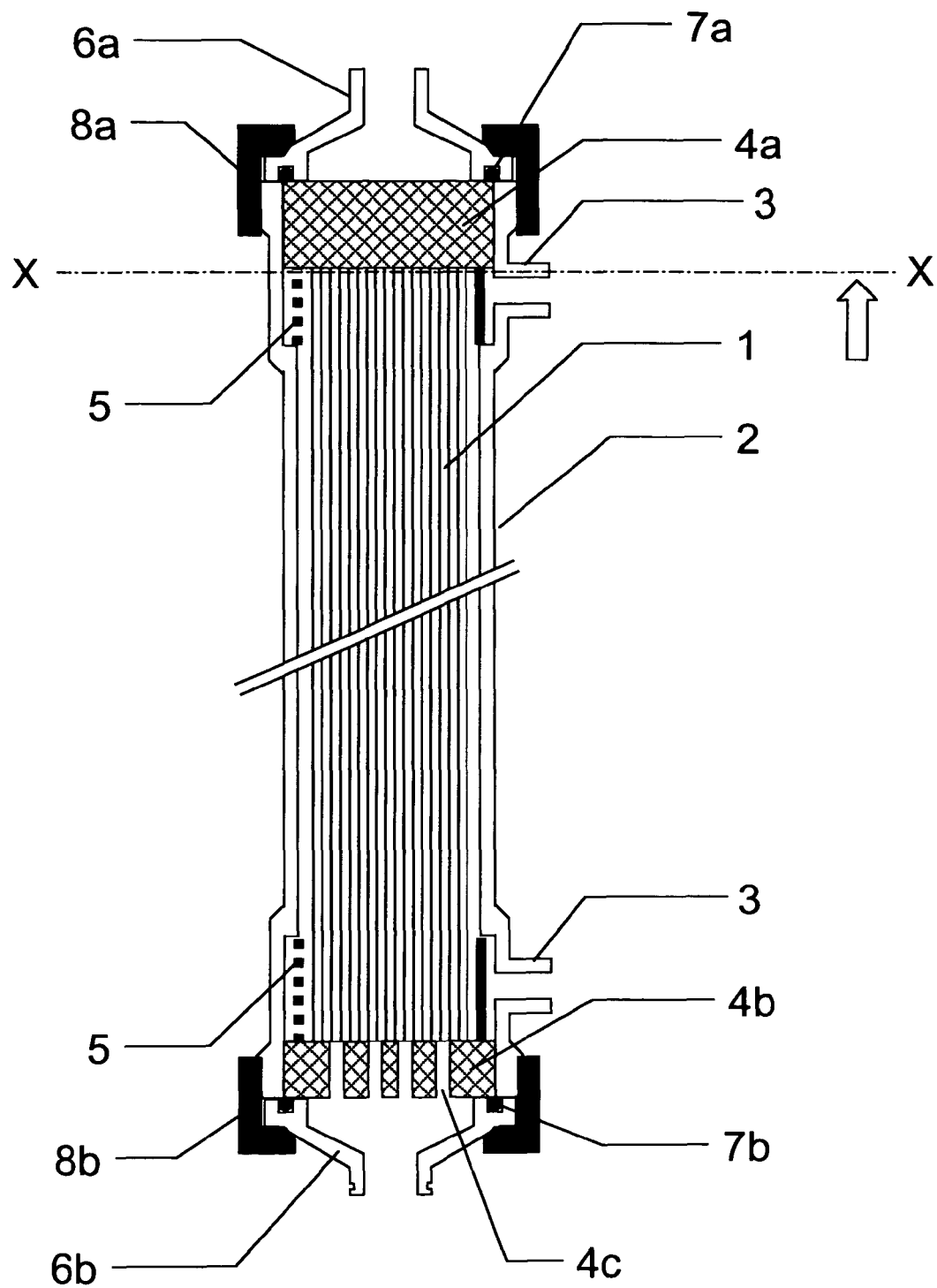
FIG. 1 is a longitudinal sectional view showing one example of a housing-integrated hollow fiber membrane module according to the present invention.
Figure 2:
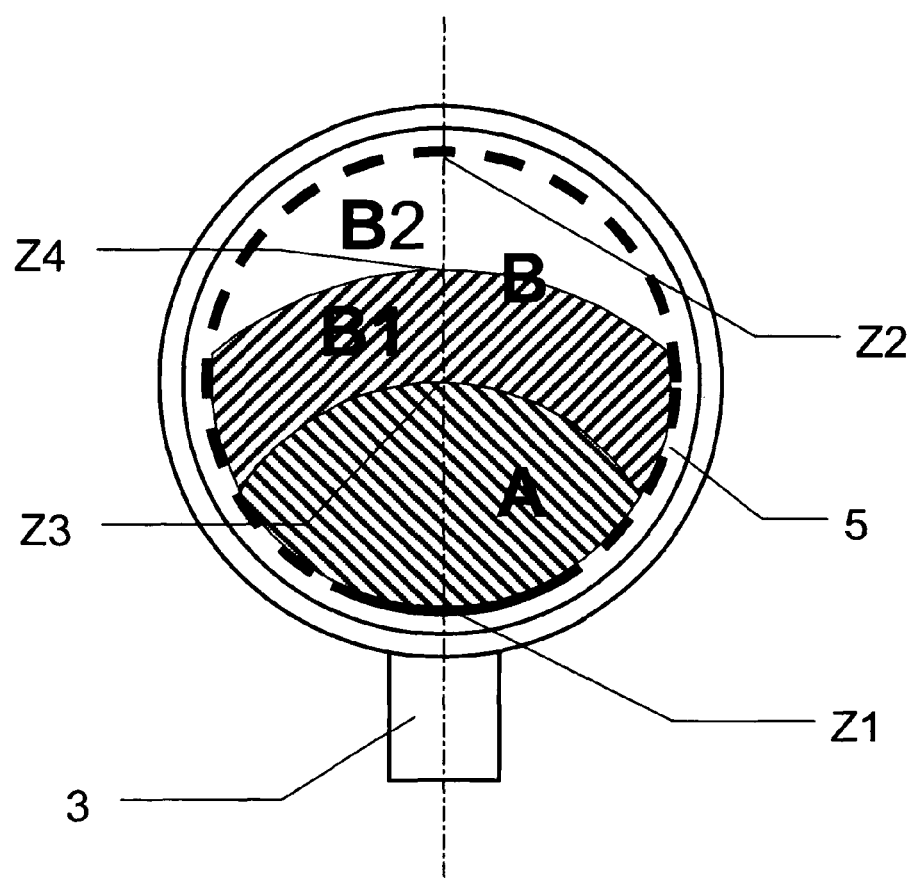
FIG. 2 is an explanatory drawing of "membrane chargeable region" in a housing-integrated hollow fiber membrane module.
Figure 3:
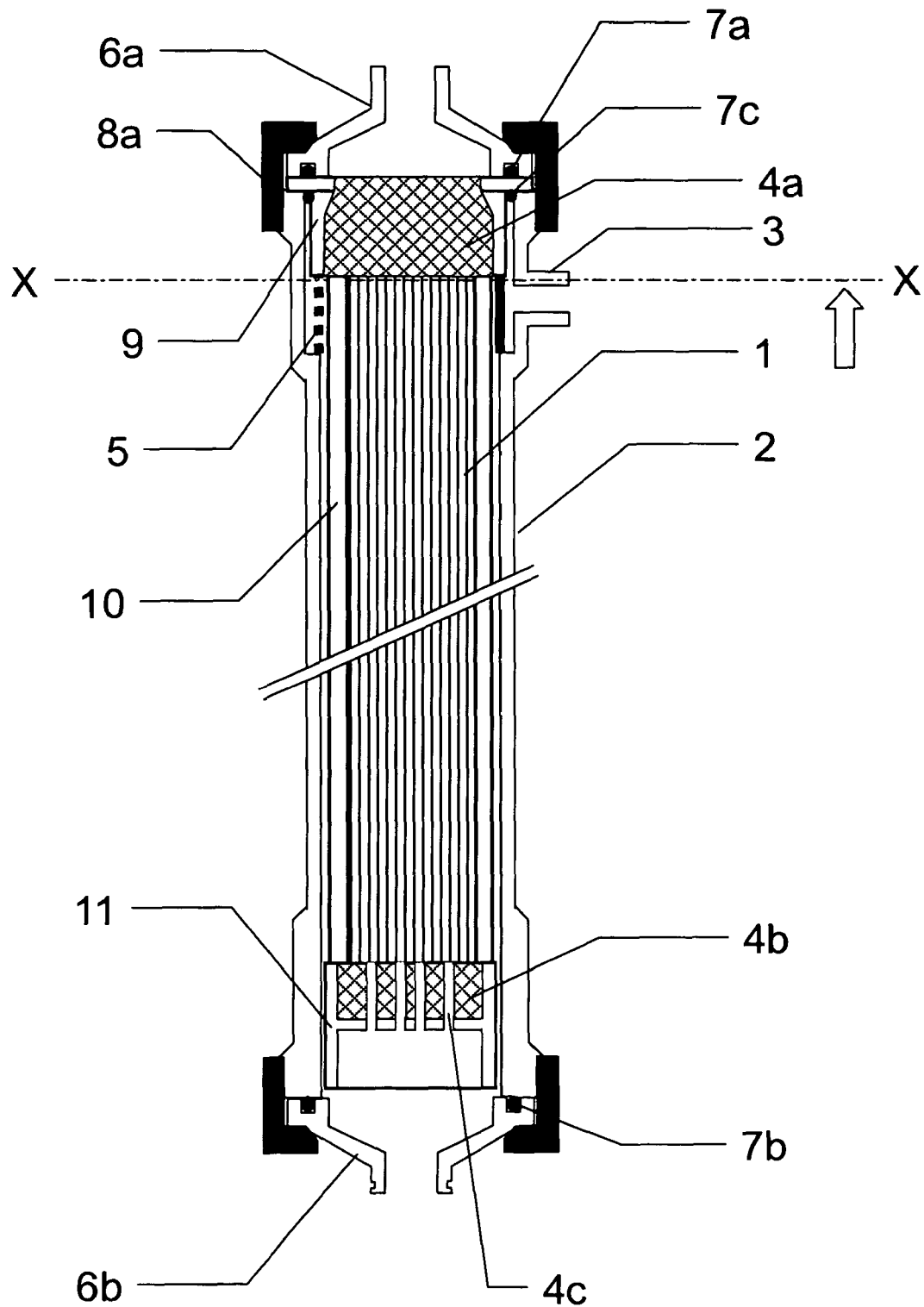
FIG. 3 is a longitudinal sectional view showing an example of a cartridge type hollow fiber membrane module according to the present invention.

In the next place, the present invention will be described in detail with reference to examples shown in FIGS. 1 and 3. FIG. 1 is an example of an integral module having a housing 2 which constitutes a module and a hollow fiber membrane 1 which are fixedly adhered to each other, and FIG. 2 shows a cross section in a line X-X shown in FIG. 1. In addition, FIG. 3 shows an example of a cartridge type module composed of the housing 2 (FIG. 4) and a hollow fiber membrane element (FIG. 5), and FIG. 6 shows the cross section in a line X-X shown in FIG. 3. The "membrane chargeable region in the inner side of an adhesively-fixed part" according to the present invention means the region of the inner surface of the adhesively-fixed part, and further means that the region can charge the membrane. Specifically, the membrane chargeable region is the region surrounded by a current cylinder 5 shown in FIG. 2, and is a region in the inner side of a cartridge head 9 shown in FIG. 6. Furthermore, the "neighboring region (A) of a nozzle" according to the present invention means when the intersection points of the central axis of the nozzle with an outer circumference of the membrane chargeable region are defined as Z1 and Z2, a part of the membrane chargeable region contained in a circle drawn by setting intersecting point Z1 in a closer side to the nozzle as the center and a distance between intersecting point Z1 and center point Z3 of the membrane chargeable region as a radius. In addition, the "non-neighboring region (B) of a nozzle" means the region other than neighboring region (A) in the membrane chargeable region. Furthermore, the "first non-neighboring region (B1)" means a part of non-neighboring region (B) contained in a circle drawn by setting intersection point Z1 as the center and a distance between middle point Z4 of Z2 and Z3 and Z1 as a radius. The "second non-neighboring region (B2)" means a part of non-neighboring region (B) other than the first non-neighboring region. In addition, the "membrane-occupying rate" according to the present invention means a rate (percentage) of a total cross section M of the membrane with respect to an area S of an objective region, and is determined by a method of dividing the area of the objective region into the total cross section calculated from the number of the hollow fiber membrane in the objective region and a membrane outside diameter and by a method of analyzing an image with the use of a computer.

As shown in FIG. 2, a partial portion of a circumference of the hollow fiber membrane bundle is within the neighboring region (A), and the rest of the circumference of the hollow fiber membrane bundle is within the non-neighboring region (B). The membrane-occupying rate at the partial portion of the circumference of the hollow fiber membrane bundle (i.e., PA) is higher than the membrane-occupying rate at the rest of the circumference of the hollow fiber membrane bundle (i.e., PB (PB1 or PB2)), and the membrane-occupying rate at the rest of the circumference of the hollow fiber membrane bundle (i.e., PB (PB1 or PB2)) is not higher than the membrane-occupying rate at the center (i.e., Z3) of the hollow fiber membrane bundle (i.e., at the boundary of PA and PB1).

Figure 7:
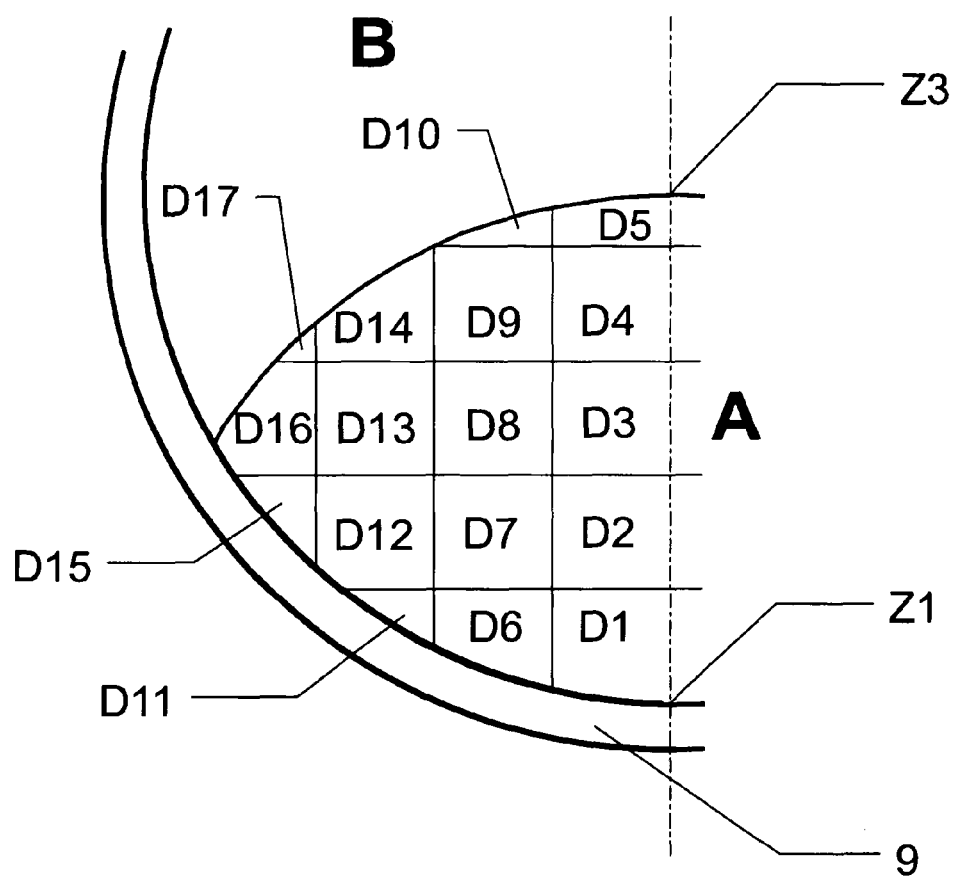
FIG. 7 is an explanatory drawing of "unit region (C)" according to the present invention.

In neighboring region (A), it is preferable that membrane-occupying rate PC in every unit region (C) constituting neighboring region (A) is 0.5 times or more with reference to the membrane-occupying rate PA in neighboring region (A). PC is more preferably 0.6 times or more, and further preferably is 0.7 times or more. This means that there is no remarkably nondense local part in neighboring region (A), thereby can more reliably prevent the membrane from being damaged or ruptured. Here, the "unit region (C)" means region (D) divided by squares having a particular spacing determined by a plurality of straight lines parallel and orthogonal to a central axis of a nozzle when considering intersection point Z1 of the central axis of nozzle 3 and the membrane chargeable region as a base point. The "particular spacing" is a value of 15R when R is defined as an average value of the outside diameter of the hollow fiber membrane. A divided section (D) in a peripheral part of neighboring region (A) does not become to be a quadrangle having a length corresponding to the particular spacing and thereby having a defective part, but the divided section is combined with an adjacent divided section in a parallel direction to the central axis of the nozzle so as to form a region having an area of not less than $225R^2$ and less than $450R^2$ by the minimum number of coalescence, and the coalescent region is considered as one unit region. At this time, when a coalescent region (D) does not reach $225R^2$ by combining only the adjacent divided section in the parallel direction to the central axis of the nozzle, the coalescent region (D) is further combined with one or two divided sections among the adjacent divided sections in the orthogonal direction to the central axis with respect to those divided sections. In this case, the divided sections to be combined is selected so that the total area of the coalescent region can be $225R^2$ or more and closest to $225R^2$. The procedure will be now specifically described with reference to an example shown in FIG. 7. Even when divided section (D17) is combined with the adjacent divided section (D16), the coalescent region does not reach the area of $225R^2$, and thus is further combined with divided section (D15) to form unit region (C1). Furthermore, divided section (D14) is combined with divided section (D13) to form unit region (C2), and divided section (D11) is combined with divided section D12 to form unit region (C3). Furthermore, divided section (D10) is combined with divided section D9, divided section (D6) with divided section D7, divided section (D5) with divided section (D4) and divided section (D1) with divided section (D2) to form a unit region (C4), (C6), (C7) and (C9), respectively. In this case, D8 and D3 singularly form unit region (C5) and unit region (C8), respectively.

A non-neighboring region (B) preferably contains at least one unit region (C) constituting non-neighboring region (B), of which membrane-occupying rate PC is less than 0.5 times with reference to membrane-occupying rate PB in non-neighboring region (B). It is particularly preferable that a plurality of unit regions (C) of which PC is less than 0.5 times with reference to PB continuously exist from the center of a membrane bundle to the outer circumference part thereof. The membrane module having such distributed membrane bundles can further improve the dischargeability of a deposit on the membrane surface, and thereby can prevent fluid from being concentrated in neighboring region (A) of a nozzle.

A cartridge type module as shown in FIG. 3 is composed of a hollow fiber membrane element and a housing having a nozzle in an upper side face, through which raw water and/or fluid for cleaning enters and exits. In the hollow fiber membrane element both ends of a plurality of the hollow fiber membranes are adhesively fixed, the hollow part of the upper end of the hollow fiber membrane is opened, the hollow part of the lower end of the hollow fiber membrane is sealed, and further a plurality of through holes are arranged in a lower adhesively-fixed part. The hollow fiber membrane element is accommodated into the housing and is fluid-tightly fixed with a holder and a sealant. It is important to set the hollow fiber membrane element so that a membrane-occupying rate in the membrane chargeable region in the inner side of an upper adhesively-fixed part is not uniform but has the dense and nondense distributions, and further a region having a comparative low membrane-occupying rate is arranged in the opposite side of the nozzle of the housing. As a result of such a setting, the module of which a ratio PB/PA of the membrane-occupying rates in neighboring region (A) of the nozzle with reference to that in non-neighboring region (B) of the nozzle has a range of 0.50 or more but 0.95 or less shows an effect of the present invention.

Figure 8:
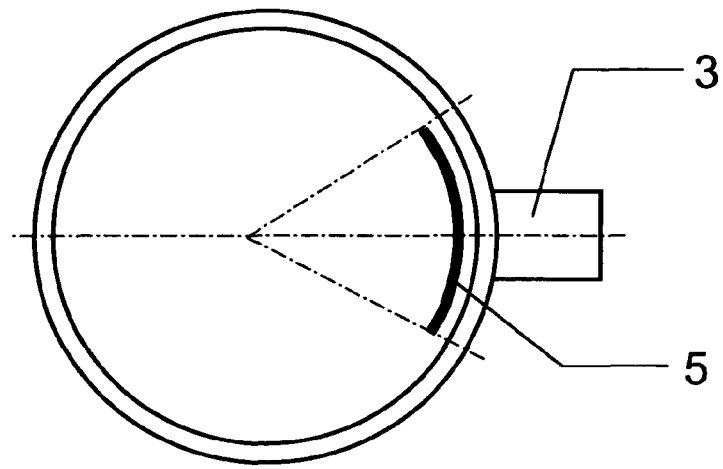
FIG. 8 is a sectional view showing one example of a current plate in a housing-integrated hollow fiber membrane module according to the present invention.
Figure 8:
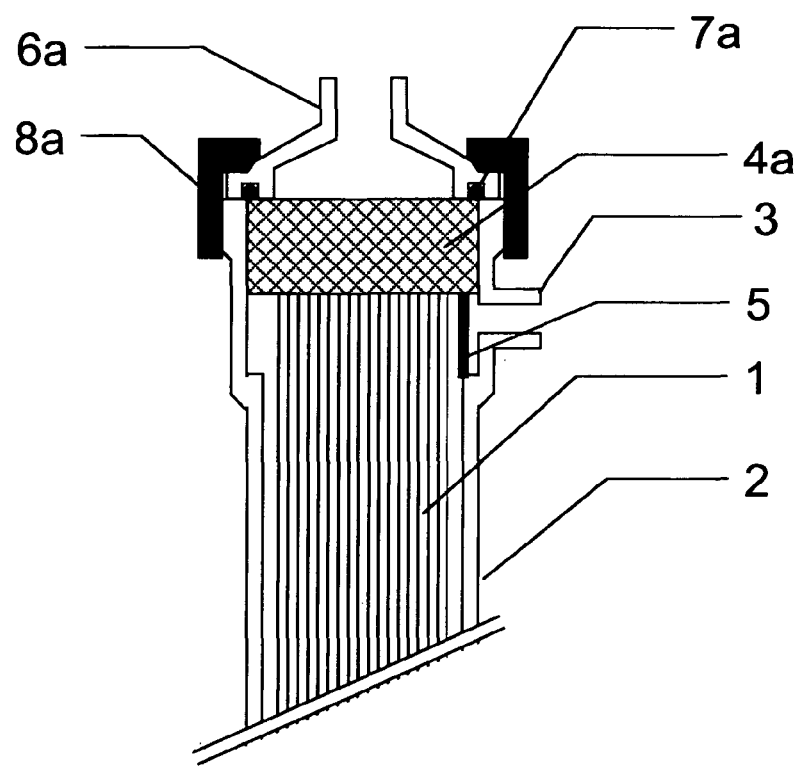
Figure 9:
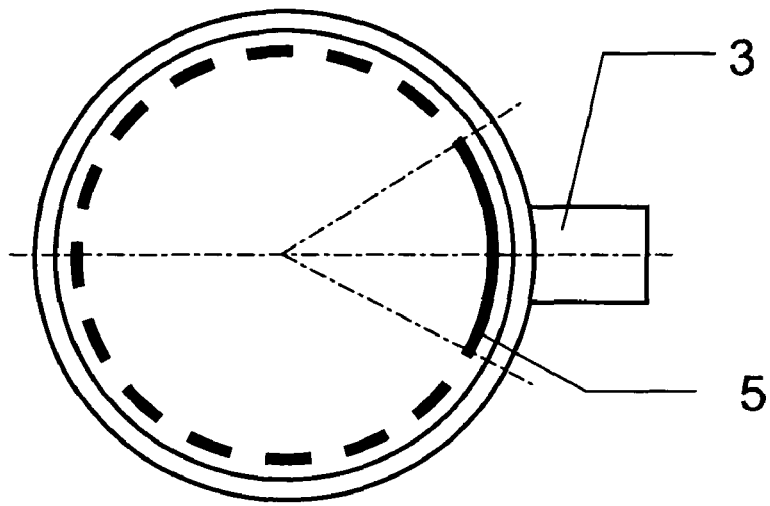
FIG. 9 is a sectional view showing another example of a current plate in a housing-integrated hollow fiber membrane module according to the present invention.
Figure 9:
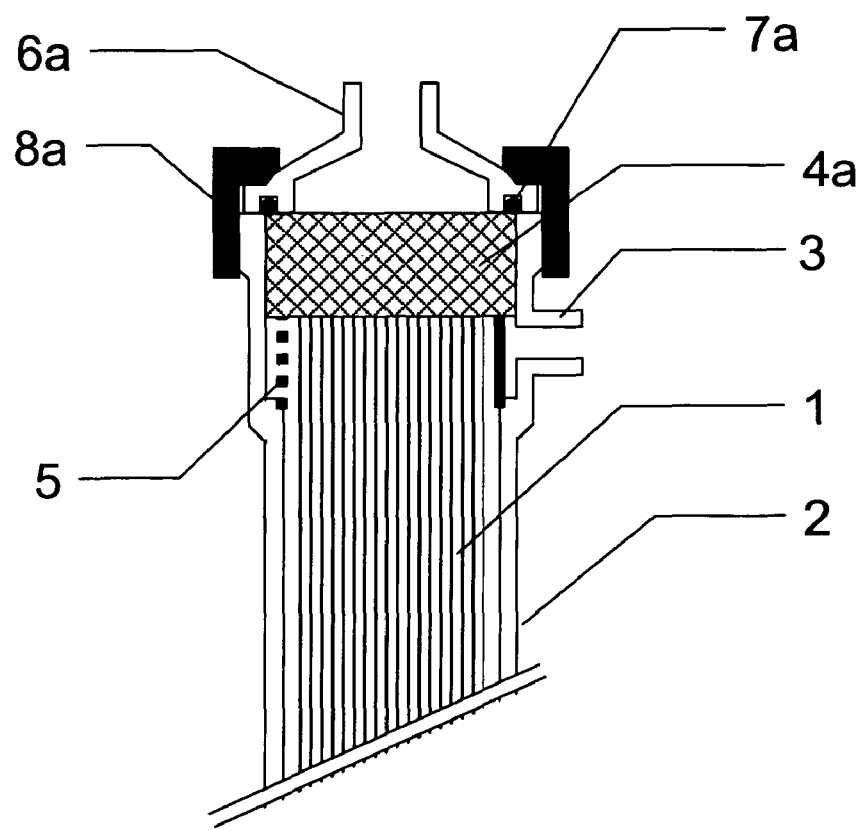

The module according to the present invention preferably has a current plate 8 which is arranged to hold the spacing between the hollow fiber membrane bundle and the inner wall of the housing in the vicinity of the nozzle. The current plate 8 may be arranged only in the vicinity of the nozzle in both directions of an internal circumferential direction of the housing and an axial direction of the housing as shown in FIG. 8, but such a cylindrical body (a current cylinder) is preferable which is arranged in the vicinity of the nozzle in the axial direction of the housing and is set to surround the outer circumference of a hollow fiber membrane bundle, as shown in FIG. 9. It is particularly preferable that the current plate has no such hole as to penetrate through the wall thereof in a region of the bilaterally symmetrical range of 60 degrees to 120 degrees from the central axis of the nozzle and has through holes in the other region. The current plate has preferably such a length in the axial direction of the housing as to start in the inner side of an adhesively-fixed part and extend to a position over the opening of the nozzle in a central side of the housing.

In addition, the module according to the present invention can also have the nozzle arranged in the lower side face of a housing to introduce raw water and/or a fluid for cleaning therein. Also, in this case, it is preferable to arrange the above current plate in the module.

The integral type hollow fiber membrane module having characteristics according to the invention and the hollow fiber membrane element constituting the cartridge type module having characteristics according to the present invention can be easily manufactured by previously introducing a plurality of columnar materials into an end of a hollow fiber membrane bundle, accommodating them in a vessel for forming an adhesively-fixed part, and forming the adhesively-fixed part by injecting the adhesive bond and curing it.

The columnar material needs to have a length of 0.3 times or more but 0.9 times or less with reference to the thickness of an adhesively-fixed part, and particularly preferably 0.5 times or more but less than 0.8 times, in the adhesively-fixed part of neighboring region (A). In addition, the length in the adhesively-fixed part of non-neighboring region (B) is preferably 0.3 times or more but less than 1.0 time. The module which uses the above columnar materials having such length improves dischargeability for suspensoid and shows the effect of reliably preventing the membrane from being damaged and ruptured.

The columnar material can increase a bulk of the hollow fiber membrane bundle by being inserted into an end of the hollow fiber membrane bundle, and can control the distributed state of the hollow fiber membrane, in other words, the dispersion of a membrane-occupying rate, by being placed in an adequate insertion point. A ratio PB/PA of membrane-occupying rates can be controlled to approximately 0.95, for instance, by inserting a plurality of the columnar materials so as to be uniformly distributed in a cross section of the hollow fiber membrane bundles and spreading the hollow fiber membrane bundles into the whole membrane chargeable region. Furthermore, the ratio PB/PA of the membrane-occupying rates can be controlled to approximately 0.50 by arranging the columnar materials so that the comparative large amounts of them are distributed in non-neighboring region (B) of the nozzle. In addition, the distribution of the membrane-occupying rate can be specifically controlled by (1) a method of changing the density of the inserted points while using the columnar materials with the same thickness and (2) a method of keeping the density of the insertion point constant and changing the thickness of the columnar material.

A cross-sectional shape of the columnar material is not limited in particular, and includes, for instance, a circle, an elliptic shape, a polygon such as a square, a hexagon and a star, and a tabular shape. A preferred cross-sectional shape of the columnar material is the circle or the elliptic shape which is not likely to damage a hollow fiber membrane when the columnar material contacts with a fiber membrane. In addition, when the shape of the columnar material is a circle, an elliptic shape, a polygon such as a square, a hexagon or a star, the thickness is preferably 5 times or more but 20 times or less with reference to an outside diameter of the hollow fiber membrane from the view point of easiness for controlling the distribution of the membrane. The "thickness" described here means the diameter of an estimated circle for a maximum cross section in a longitudinal direction of the columnar material. The outside diameter of the hollow fiber membrane is generally 0.6 to 2.5 mm, so that the thickness of the columnar material is specifically selected by the range of 3 to 50 mm, preferably by the range of 3 to 30 mm, and particularly preferably by the range of 5 to 20 mm. When the columnar material has a tabular shape, the average thickness is preferably 3 times or more but 15 times or less with reference to the outside diameter of the hollow fiber membrane for the same reason as described above. In addition, preferably, the shape of the top of the columnar material is previously formed into such a shape as the columnar material can be easily inserted into a hollow fiber membrane bundle, specifically as a cone shape. The columnar material is not particularly limited to a high polymer material, an inorganic material and a metallic substance, but a preferred material is a substance having adhesive strength with the adhesive bond which constitutes an adhesively-fixed layer as well as having tensile elasticity equal to or higher than that of the adhesive bond.

In a method for manufacturing an external pressure type hollow fiber membrane module according to the present invention, when the module is an integral type, a vessel for forming an adhesively-fixed part can be composed of a housing case itself and an end vessel which is fluid-tightly fixed to the end of the housing case. An adhesive bond may be injected from an adhesive-injecting port provided beforehand in the end vessel, or can be directly injected from a nozzle provided in the housing case. On the other hand, when the module is a cartridge type having a hollow fiber membrane element, the vessel for forming the adhesively-fixed part is composed of a head member constituting the element and an end vessel which is fluid-tightly fixed to the head member. Alternatively, the vessel for forming the adhesively-fixed part may be made by integrating the head member with an end vessel part so as to form a vessel shape. The adhesive bond may be injected from the adhesive-injecting port provided in the end vessel part, or can be directly injected from an opening end of the head member (a part into which the hollow fiber membrane bundle is inserted). Furthermore, in the hollow fiber membrane element, the adhesively-fixed part can be composed of only the adhesive bond and the hollow fiber membrane by preparing the vessel for forming the adhesively-fixed part from a material having a low adhesive strength with a cured adhesive bond; making it into a peelable structure; curing the adhesive bond; and then peeling and removing the vessel.

In the manufacturing method according to the present invention, the injection/curing of the adhesive bond may be conducted by the so-called centrifugal adhesion method using the centrifugal force, or can be injected with the so-called settling adhesion method of forcefully injecting the adhesive bond in a state of leaving an adhesively-fixed part at rest and curing it. The centrifugal adhesion method is preferable because the method uniformly forms a coating layer on the outer surface of a hollow fiber membrane at the inner surface of the adhesively-fixed part, and thus hardly causes the rupture of the membrane. When the centrifugal adhesion method is employed, as a general rule, the injection/curing of the adhesive bond is applied by horizontally setting the module in the state of directing a nozzle upward and rotating it (for instance, see Patent Document 1), but when the module according to the present invention is manufactured with the use of the centrifugal adhesion method, it is preferable to horizontally set the module in the state of directing the nozzle more downward than the horizontal position and rotate it. This is because when the module is set in the state of directing the nozzle downward, the module hardly forms the part having a low membrane-occupying rate in neighboring region (A) of a nozzle. In addition, when the injection/curing of the adhesive bond is applied with the centrifugal adhesion method, it is preferable to stop the rotation at a stage when the curing reaction has proceeded to the extent that the adhesive bond is not fluidized any more, and subsequently to heat the adhesive bond in an oven to complete the reaction so that the adhesive bond can reach to a practical cured condition.

The hollow fiber membrane used in the present invention includes a reverse osmotic membrane, a nano filtration membrane, an ultrafilter membrane and a precise filtration membrane.

The material for the hollow fiber membrane is not particularly limited, and includes polysulfone, polyethersulfone, polyacrylonitrile, polyimide, polyetherimide, polyamide, poly etherketone, polyetheretherketone, polyethylen, polypropylene, poly(4-methyl pentene), ethylene-vinylalcohol copolymer, cellulose, cellulose acetate, polyvinylidene fluoride, ethylene-tetrafluoroethylene copolymer, polytetrafluoroethylene, and the composite materials thereof.

In addition, as for a preferable shape of a hollow fiber membrane, the inner diameter is preferably 50 to 3,000 μm, and further preferably 500 to 2,000 μm, and the ratio of inner/outer diameter is preferably 0.3 to 0.8. Furthermore, the hollow fiber membrane preferably has a wave. When the hollow fiber membrane has the wave, it can decrease the number of columnar materials used for controlling the distribution of the membrane-occupying rate.

The form of the wave, namely, the degree of the wave is expressed by the crimping degree of the hollow fiber bundle. The crimping degree is preferably 1.45 or more but less than 2.5, and particularly preferably is 1.50 or more but 2.0 or less. When the module is made of the hollow fiber membrane bundle having the crimping degree of the above range, the module can control the distribution of membranes into a predetermined membrane distribution by using a smaller quantity of them, can prevent the membrane from being damaged and ruptured, and further can exert physical cleaning effects without obstructing the oscillation of the membrane in the housing. The crimping degree described here is a value determined by bundling 1,000 hollow fiber membranes and putting it in order, winding a PET film with a thickness of 200 μm and a width of 40 mm having a spring balance attached at an end around the hollow fiber membrane bundle, pulling the spring balance so as to apply the load of 1 kg onto the bundle, measuring a peripheral length of the hollow fiber membrane bundle in the condition, and calculating the value according to the following expression.

$$\text{Crimping degree} = (\text{peripheral length } [m]/\pi)^2/((\text{outside diameter of hollow fiber membrane } [m]^2 \times \text{the number of hollow fiber membranes})).$$

When manufacturing the hollow fiber membrane module or the membrane element constituting the module by using a membrane having the above described wave, the number of the above described columnar materials can be reduced to 5 to 0 by controlling a ratio S2/S1 of the area S2 of a membrane chargeable region in the end face of an adhesively-fixed part with reference to the area S1 of the membrane chargeable region in the inner side of the adhesively-fixed part to be 0.7 or more but 0.9 or less. The ratio S2/S1 is particularly preferable in a range of 0.80 or more but 0.90 or less.

The adhesive bond used in the present invention preferably includes a high polymer material of an epoxy resin, a urethane resin, an epoxy acrylate resin, a silicon resin or the like. Among them, the urethane resin is particularly preferable because of completing the reaction in a relatively short time. In addition, the adhesively-fixed layer composed of the adhesive bond needs to have such pressure resistance as to endure a differential pressure generated during use, and thus has preferably adequate hardness. On the other hand, in order to reliably prevent the hollow fiber membrane from being ruptured due to the fluid flow in physical cleaning for a longer period it is preferable to use the adhesive bond having adequate softness. Accordingly, in order to impart the pressure resistance necessary and sufficient for use and reliably prevent the rupture of the membrane, it is preferable to use the adhesive bond having hardness between 70D and 50A in a range of operating temperatures. The hardness described here means the value shown by a Shore hardness gauge in 10 seconds after pushing it onto the surface of a sample substantially having a smooth surface. When the above value exceeds 70D, the adhesively fixed layer may cause the above described rupture of the membrane, and when the value is lower than 50A, the pressure resistance of the adhesively fixed layer may be insufficient.

In the next place, the present invention will be described with reference to examples and reference examples.

EXAMPLE

Example 1

6,600 hollow fiber membranes made from PVDF (which is manufactured by Asahi Chemical Industry) in which one end of a hollow part was plugged were made into one bundle, and further were inserted in a housing case 2 having a head part in which a current cylinder 5 with the inside diameter of 154 mm is placed inside, as described in FIG. 1. The head part has a nozzle 3 with an inside diameter of 40 mm, and the central axis of the nozzle is the normal line of the head. The current cylinder has a cylindrical shape having 240 through-holes 4C with the diameter of 5 mm$\phi$ in a region except a part of symmetrically forming 90 degrees in total with respect to the nozzle central axis. The used hollow fiber membrane 1 had the pore size of 0.1 μm, the inside diameter of 0.65 mm and the outside diameter of 1.22 mm, and had a wave with the crimping degree of 1.65. Subsequently, 28 columnar bars (which were previously formed by charging and spreading such an adhesive bond as described below into a mold and then curing it) having the outside diameter of 11 mm were inserted/placed into the end part of a membrane bundle of a plugged hollow part side so as to be uniformly distributed. In addition, 24 columnar bars with the outside diameter of 11 mm, which are made from polyethylene, were inserted/placed into the end part of a membrane bundle of an opened hollow part side so as to be uniformly distributed. Subsequently, the adhesive bond was injected into the head of the housing case by fixing an adhesion cup having a tube for introducing the adhesive bond attached thereon at both ends of the housing case, horizontally fixing the housing case on a frame for centrifugation in a state of directing the nozzle downward at 45 degrees, and horizontally rotating it. The used adhesive bond was a two-component thermosetting type urethane resin (which is manufactured by Sanyu Rec Co., Ltd.: SA-6330A2/SA-6330B5 (product name)). When the fluidization of the adhesive bond stopped due to the proceeding of the curing reaction, the rotation of a centrifugal machine was stopped, and then the housing case was taken out and heated at 50° C. in an oven to be cured. Then, the end of the housing case was cut to open a hollow part in the side in which the hollow part was plugged in a stage before being adhesively bonded, and all the columnar bars which are made from polyethylen in an opposite end were removed to form through holes. The present membrane of the module had an active length of 2 m.

Subsequently, the housing case was joined with caps 6a and 6b through O-rings 7a and 7b by using housing nuts 8a and 8b, and then the module was attached to a filtering device in the state of directing an opened hollow part side upward, and was subjected to physical cleaning durability tests as described below.

Clean water was supplied into the module from a side of an upper adhesively-fixed part 4a at the flow rate of 8 m$^3$/hr, and simultaneously air was supplied therein from a side of a lower adhesively-fixed part 4b at the flow rate of 7 m$^3$/hr. Both of supplied fluids were discharged through the nozzle of the upper head. The above described operation was continued except the time of a leak test which was carried out every one month. In addition, a water temperature was held at 5° C. during the operation.

Even after the operation for six months, a leak due to the rupture of a membrane did not occur. This operation period is equivalent to the operation period of ten years or more in terms of a practical filtration operation.

After the test was finished, the inner part of the upper adhesively-fixed part of the module was cut, the membrane was picked off, and an adhesively bonded surface was observed in detail. When having taken a photograph of the inner surface of the adhesively-fixed part, enlarged the photograph to an A3 size, and measured a distributed state of a hollow fiber membrane, PA, PB1 and PB2 was 0.44, 0.43 and 0.34 respectively, the ratio PB/PA of membrane-occupying rates was 0.89, and the membrane-occupying rate PC in every unit region (C) was 0.8 to 1.2 times with reference to the membrane-occupying rate PA in neighboring region (A). However, there was only one unit region (C) having the membrane-occupying rate of less than 0.5 times with reference to the membrane-occupying rate PB in the contour part of a bundle in the second non-neighboring region (B2).

Subsequently, an adhesively-fixed part was cut at a position of 5 mm distant from the inner surface of the upper adhesively-fixed part to form a smooth cross section, and the hardness of the adhesive-bond part of the cut surface was measured. As a result, Shore hardness was 65D at 5° C. and was 40D at 40° C.

In addition, a length of the columnar bar inserted at the adhesively-fixed part was 50 mm, while the length of the upper adhesively-fixed part was 65 mm, and the ratio was 0.77.

Example 2

Figure 5:
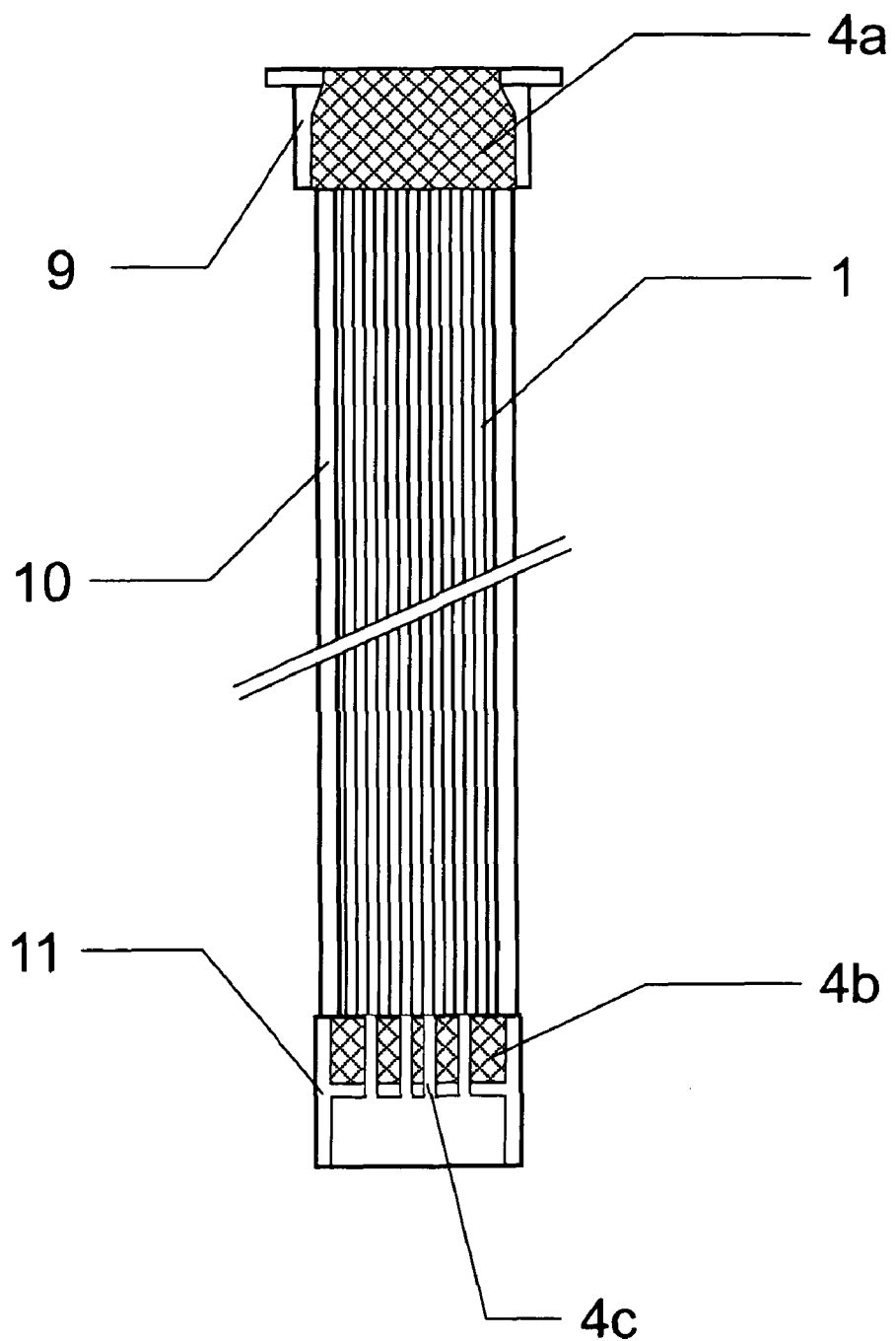
FIG. 5 is a longitudinal sectional view showing one example of a hollow fiber membrane element in a cartridge type hollow fiber membrane module according to the present invention.
Figure 6:
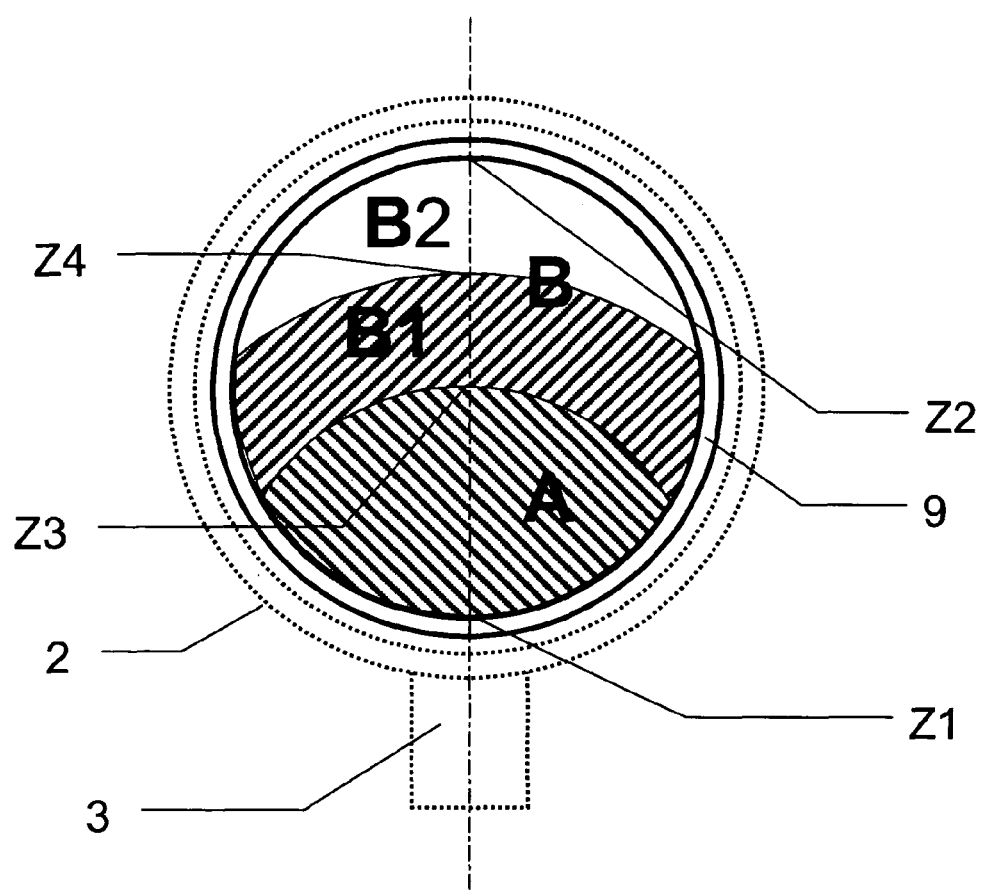
FIG. 6 is an explanatory drawing of "membrane chargeable region" in a cartridge type hollow fiber membrane module.

A hollow fiber membrane element as shown in FIG. 5 which includes a cartridge head 9 having a flat flange; a lower ring 11 having 24 through holes with the diameter of 11 mm$\phi$ and having a protrusion part with a length of 40 mm; and two pipe-shaped struts (10) which are made from SUS with an outside diameter of 10 mm and a wall thickness of 1 mm was prepared by using 6,600 hollow fiber membranes as in the case of Example 1. The strut was arranged in the outermost circumference of a hollow fiber membrane bundle, and was adhesively fixed with the use of the hollow fiber membrane and a two-component thermosetting type urethane resin (which is manufactured by Sanyu Rec Co., Ltd.: SA-6330A2/ SA-6330 B4 (product name)). The cartridge head was integrally formed with an end vessel part, and has a port for introducing adhesive bond in the end vessel part. The hollow fiber membrane bundle was adhesively bonded with the cartridge head and the lower ring by setting the end part of the membrane bundle which was present in the side where a hollow part was plugged inside the cartridge head without placing any particular insert in the bundle, setting the end part of the membrane bundle in the side where the hollow part was opened inside a lower ring, and then inserting/fixing 24 columnar bars made from polyethylen in the hollow fiber membrane bundle through holes in the lower ring, horizontally fixing them on a holder for adhesion, and adhesively bonding them with a centrifugal method in the fixed state. The adhesive bond was settled at room temperature and cured by heating as in the case of Example 1, the end vessel part of the cartridge head was cut to open the hollow part in the end of the hollow fiber membrane, and the columnar bars which are made from polyethylen were pulled out from the lower ring to form the through holes. The present hollow fiber membrane element had an active length of 2 m.

The inside diameters of the cartridge head and the lower ring were respectively 155 mm and 144 mm, and the thicknesses of adhesive layers in the cartridge head and the lower ring were respectively 65 mm and 30 mm. In addition, the inside diameter of an end vessel part in a cut end was 140 mm, and S2/S1 was 0.82. In an adhesively-fixed part in the cartridge head side, it was observed that the hollow fiber membranes were nondensely fixed on the part which had been placed in the upper side when they were adhesively bonded with a centrifugal method.

Figure 4:
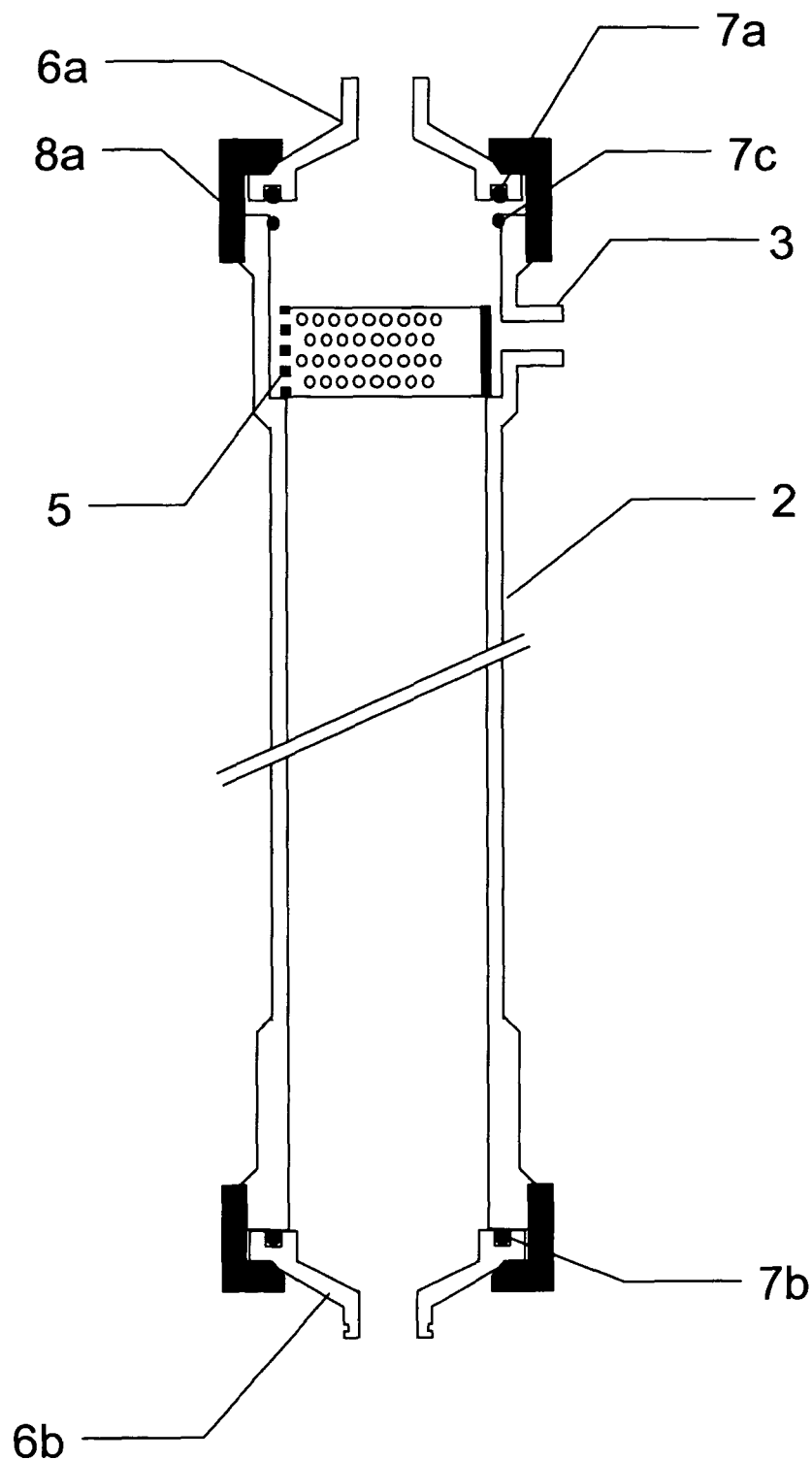
FIG. 4 is a longitudinal sectional view showing one example of a housing for a cartridge type hollow fiber membrane module according to the present invention.

A membrane module as shown in FIG. 3 (where 7c shows an O-ring for a cartridge) was prepared by employing a case as shown in FIG. 4, which is similar to Example 1 except that the case had no nozzle and current cylinder in a lower side face, as a housing, and accommodating the above described hollow fiber membrane element in the housing. When accommodating the hollow fiber membrane element, the side in the comparative nondense state of the hollow fiber membrane was set so as to be an opposite side to an exhaust port provided in the housing. The positional relationship between the side in the comparative nondense state and the exhaust port set at the time was inscribed on the cartridge head.

The above described module was attached to a rack device, and was subjected to a physical cleaning durability test as in the case of Example 1.

Even after the operation for six months, a leak due to the rupture of a membrane did not occur.

After having finished the test, an adhesively-bonded surface was observed in detail as in the case of Example 1. As a result, PA, PB1 and PB2 were 0.48, 0.40 and 0.24 respectively, and the ratio PB/PA of membrane-occupying rates was 0.70, and further the membrane-occupying rate PC in every unit region (C) was 0.7 times to 1.6 times with reference to the membrane-occupying rate PA in neighboring region (A). In the region of from the first non-neighboring region (B1) to the bundles in the contour part of the second non-neighboring region (B2), there were three unit regions (C) having the membrane-occupying rate of less than 0.5 times PB.

Subsequently, an adhesively-fixed part was cut at a position of 5 mm distant from the inner surface of the adhesively-fixed part in a cartridge head to form a smooth cross section, and the hardness of the adhesive-bond part of the cut surface was measured. As a result, Shore hardness was 53D at 5° C. and 37D at 40° C.

Example 3

With the use of 6,400 hollow fiber membranes made from PVDF (which is manufactured by Asahi Chemical Industry), of which each had a pore size of 0.1 μm, an inside diameter of 0.68 mm, an outside diameter of 1.25 mm and no wave, a module was prepared as in the case of Example 1 except that 14 columnar bars were inserted into a half region of a membrane bundle in a nozzle side and 18 columnar bars into the region in the opposite side to the nozzle.

The module was subjected to a physical cleaning durability test as in the case of Example 1, and as a result, even after the operation for six months, a leak due to the rupture of a membrane did not occur.

After the test was finished, the hollow fiber membrane module was cut in the inner side of an adhesively-fixed part in a cartridge head, the membrane was picked off, and the adhesively-bonded surface was observed in detail. When having taken a photograph of the inner surface of the adhesively-fixed part, enlarged the photograph to an A3 size, and measured a distributed state of a hollow fiber membrane, PA, PB1 and PB2 was 0.46, 0.44 and 0.30 respectively, the ratio PB/PA of membrane-occupying rates was 0.83, and the membrane-occupying rate PC in every unit region (C) was 0.7 to 1.4 times with reference to the membrane-occupying rate PA in a neighboring region (A). In the region of from the first non-neighboring region (B1) to the bundles in the contour part of the second non-neighboring region (B2), there were two unit regions (C) having the membrane-occupying rate of less than 0.5 times PB.

In addition, a length of the columnar bar inserted at the adhesively-fixed part was 45 mm, while the length of the upper adhesively-fixed part was 65 mm, and the ratio was 0.69.

Example 4

Figure 10A:
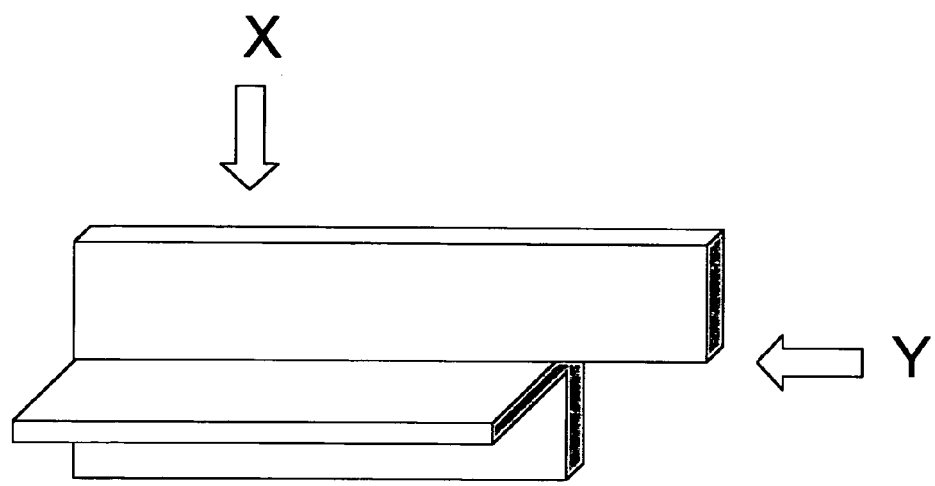
FIG. 10A is a perspective view showing one example of a cross plate in a housing-integrated hollow fiber membrane module according to the present invention.
Figure 10B:
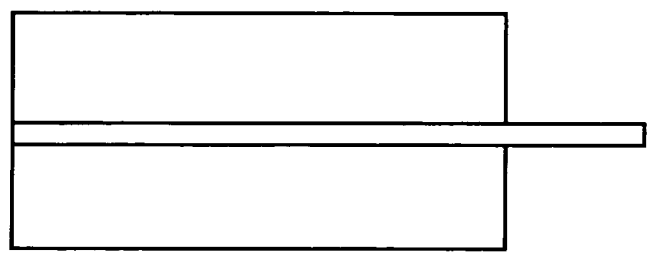
FIG. 10B is a plan view of a cross plate viewed from an X-direction in FIG. 10A.
Figure 10C:
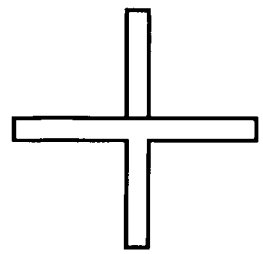
FIG. 10C is a side view of a cross plate viewed from a Y-direction in FIG. 10A.

The membrane bundle of 6,400 hollow fiber membranes which were made from PVDF as in the case of Example 3 was divided into four parts, and a cross plate as shown in FIGS. 10A to 10C was inserted into them. The cross plate had the thickness of 5 mm, and had such a shape as one side was longer than the other side by 20 mm. The membrane bundle was inserted into a housing case similar to Example 1, and was set therein so that the long side of the cross plate could be placed at a position completely opposite to a nozzle. Subsequently, six columnar bars similar to those in Example 1 were inserted into each of two fractions of a side close to the nozzle among the membrane bundles divided into four fractions, and eight columnar bars were inserted into each of two fractions in the side opposite to the nozzle. After that, the module was prepared as in the case of Example 1.

The module was subjected to a physical cleaning durability test as in the case of Example 1, and as a result, after the operation for six months, there is only one membrane that caused a leak after the operation period of six months.

After the test was finished, the hollow fiber membrane module was cut in the inner side of an adhesively-fixed part in a cartridge head, and the leaking part was observed. As a result, one membrane in the part corresponding to the position of the cross plate in the second non-neighboring region was ruptured at the adhesive interface. Further, the hollow fiber membrane was picked off and the adhesively-bonded surface was observed in detail. As a result, there existed no membranes in the width of about 3 mm in the part where the long side of the cross plate was buried. When having taken a photograph of the inner surface of the adhesively-fixed part; enlarged the photograph to an A3 size; and measured a distributed state of a hollow fiber membrane, PA, PB1 and PB2 were 0.43, 0.42 and 0.37 respectively, the ratio PB/PA of membrane-occupying rates was 0.93, and the membrane-occupying rate PC in every unit region (C) was 0.7 to 1.4 times with reference to the membrane-occupying rate PA in neighboring region (A). In the region of from the first non-neighboring region (B1) to the contour part of bundles in the second non-neighboring region (B2), there were serial three unit regions (C) having the membrane-occupying rate of less than 0.5 times PB.

In addition, a length of the columnar bar inserted in the adhesively-fixed part was 45 mm, while the length of the upper adhesively-fixed part was 65 mm, and the ratio was 0.69. In addition, the long side and short side of the cross plate were 55 mm and 35 mm respectively, and the ratios were 0.85 and 0.54 respectively.

Comparative Example 1

A hollow fiber membrane module was prepared as in the case of Example 1 except that an insert was not used when an upper adhesively-fixed part was formed and the hollow fiber membrane was adhesively-bonded with a centrifugal method in the state of having directed a nozzle upward according to a general rule.

The module was subjected to a physical cleaning durability test as in the case of Example 1, and as a result, the leaks occurred in two membranes after one month, and the leads occurred in 20 or more membranes in cumulative total after two months. The test was finished at this time, and the membrane module was disassembled. As a result, every membrane having caused the leak was ruptured in the side close to a nozzle of the upper adhesively-fixed part.

When having observed the distributed state of the hollow fiber membrane as in the case of Example 1, there nondensely existed the membrane in a nozzle side of a housing, and there existed no membrane in the region of about 10 cm$^2$. As a result of the measurement of the distributed state, the ratio PB/PA of membrane-occupying rates showed 2.5.

Comparative Example 2

When having accommodated a hollow fiber membrane element prepared as in the case of Example 2 into a housing, the element was set so that the side in the comparative non-dense state in an adhesively-fixed part of a cartridge head could be closest to a nozzle provided in the housing. The positional relationship between the side in the comparative nondense state and the nozzle at the time was inscribed on the cartridge head, and then the module was subjected to a physical cleaning durability test as in the case of Example 1.

A leak occurred in one membrane after one month, and the leaks occurred in 5 membranes in cumulative total after 3 months, and in 36 membranes in cumulative total after 6 months. The test was finished at this moment, and the membrane module was disassembled. As a result, every membrane having caused the leak was ruptured in the side close to a nozzle of the upper adhesively-fixed part.

When having measured the distributed state of the hollow fiber membrane as in the case of Example 2, the ratio PB/PA of membrane-occupying rates showed 1.9.

Example 5

Modules prepared by methods described in Examples 1 to 4 and Comparative Examples 1 and 2 were attached to a rack device, and were subjected to the filtration of 1 m$^3$ of a model liquid of which the turbidity was adjusted to 1,000 ppm by adding mud in river bottom thereto, and then cleaning it by passing back wash water at the flow rate of 8 m$^3$/hr for one minute and air at the flow rate of 5 N-m$^3$/h. After the operation of filtration and cleaning was repeated five times, each module was disassembled, and the state in a membrane bundle in the vicinity of an upper adhesively-fixed part was observed.

It was observed that a large quantity of sludge accumulated in a part of second non-neighboring region in Comparative Examples 1 and 2. In contrast to this, a small quantity of sludge accumulated only in one part of first non-neighboring region in Example 1, and little sludge accumulated in Examples 2 and 3. In Example 4, a small quantity of sludge accumulated only in one part of the neighboring region.

INDUSTRIAL APPLICABILITY

The present invention provides a membrane filter module suitably used in a filtering device for clarifying and sanitizing raw water such as river water, lake water, underground water, sea water, domestic wastewater and industrial wastewater.

The invention claimed is:

1. An external pressure type hollow fiber membrane module of an external pressure type having a membrane occupying rate set to between 0.3 to 0.6, comprising:
    a hollow fiber membrane bundle formed of a plurality of hollow fiber membranes,
    a cylindrical housing, and
    a nozzle for allowing a fluid to enter into and exit therefrom,
    wherein the hollow fiber membranes are adhesively-fixedly adhered to each other and to the inner wall of the housing at ends of the hollow fiber membrane bundle and form a membrane chargeable region in the inner side of the adhesively-fixed ends;
    wherein a hollow part is opened in one side or both sides of the adhesively-fixed ends; and wherein the nozzle for allowing the fluid to enter and exit therefrom is installed on a side face of the housing of at least one adhesively-fixed end at which the hollow part is opened;
    wherein a membrane-occupying rate in the housing is set at 0.3 to 0.6,
    wherein a ratio PB/PA of membrane-occupying rates is 0.50 or more but 0.95 or less when each of PA and PB is defined as the membrane-occupying rate in a neighboring region (A) of the nozzle and a non-neighboring region (B) of the nozzle which includes all regions other than the neighboring region (A) in the membrane chargeable region in the inner side of an adhesively-fixed end of the opened hollow part,
    wherein a partial portion of a circumference of the hollow fiber membrane bundle is within the neighboring region (A), and the rest of the circumference of the hollow fiber membrane bundle is within the non-neighboring region (B), the membrane-occupying rate at the partial portion of the circumference of the hollow fiber membrane bundle is higher than the membrane-occupying rate at the rest of the circumference of the hollow fiber membrane bundle, and the membrane-occupying rate at the rest of the circumference of the hollow fiber membrane bundle is not higher than the membrane-occupying rate at the center of the hollow fiber membrane bundle.

2. An external pressure type hollow fiber membrane module of an external pressure type having a membrane occupying rate set to between 0.3 to 0.6, comprising: a hollow fiber cartridge having a hollow fiber membrane bundle formed of a plurality of hollow fiber membranes, of which both end parts are adhesively-fixed and hollow parts in at least one end of adhesively-fixed ends are opened and form a membrane chargeable region in the inner side of the adhesively-fixed ends; and a cylindrical housing accommodating the cartridge and having a nozzle for allowing a fluid to enter and exit therefrom installed on at least one side face, in which the nozzle installed is fixed so as to be placed in the vicinity of the inner surface of an adhesively-fixed part in the opened hollow parts side in the hollow fiber membrane cartridge;

wherein a membrane-occupying rate in the housing is set at 0.3 to 0.6, wherein a ratio PB/PA of membrane-occupying rates is 0.50 or more but 0.95 or less when each of PA and PB is defined as the membrane-occupying rate in a neighboring region (A) of the nozzle and a non-neighboring region (B) of the nozzle which includes all regions other than the neighboring region (A) in the membrane chargeable region in the inner side of an adhesively-fixed end of the opened hollow part, and wherein a partial portion of a circumference of the hollow fiber membrane bundle is within the neighboring region (A), and the rest of the circumference of the hollow fiber membrane bundle is within the non-neighboring region (B), the membrane-occupying rate at the partial portion of the circumference of the hollow fiber membrane bundle is higher than the membrane-occupying rate at the rest of the circumference of the hollow fiber membrane bundle, and the membrane-occupying rate at the rest of the circumference of the hollow fiber membrane bundle is not higher than the membrane-occupying rate at the center of the hollow fiber membrane bundle.

3. The external pressure type hollow fiber membrane module according to claim 1 or 2, wherein in the neighboring region (A) of the nozzle, among a membrane chargeable region in the inner side of an adhesively-fixed part, membrane occupying-rate PC is 0.5 times or more but 2.0 times or less with reference to membrane-occupying rate PA in the neighboring region (A), in every unit region (C) constituting the neighboring region (A).

4. The external pressure type hollow fiber membrane module according to claim 1 or 2, wherein PB includes region PB1 and PB2, and wherein PA, PB1 and PB2 of the membrane-occupying rates have the relation of PA≧PB1≧PB2 and further PA is 0.40 or more but 0.60 or less and PB2 is 0.20 or more but less than 0.40 when each of PB1 and PB2 is defined as a membrane-occupying rate in a first non-neighboring region (B1) and a second non-neighboring region (B2) in the non-neighboring region (B) of the nozzle among the membrane chargeable region in the inner side of an adhesively-fixed part and wherein the non-neighboring region (B1) is located in a side close to the nozzle and wherein the non-neighboring region (B2) is located in a side distant from the nozzle.

5. The external pressure type hollow fiber membrane module according to claim 1, wherein the non-neighboring region (B) of the nozzle among the membrane chargeable region in the inner side of an adhesively-fixed part includes at least one unit region in which membrane-occupying rate PC in unit region (C) constituting the non-neighboring region (B) is less than 0.5 times with reference to the membrane-occupying rate PB in the non-neighboring region (B).

6. The external pressure type hollow fiber membrane module according to claim 1 or 2, wherein a current plate is arranged in the vicinity of the nozzle of outer circumference parts of the hollow fiber membrane bundle.

7. The external pressure type hollow fiber membrane module according to claim 6, wherein the current plate is cylindrical, accommodates the hollow fiber membrane bundle inside of it, has a plurality of through-holes in a wall surface except the vicinity of the nozzle, and has no through-hole in the vicinity of the nozzle.

8. The external pressure type hollow fiber membrane module according to claim 1 or 2, wherein an adhesive bond part constituting the adhesively-fixed part is made of a single layer of a high polymer material, and has the hardness of 50A to 70D in a range of operating temperatures.

9. A method for manufacturing the external pressure type hollow fiber membrane module according to claim 1, including:

previously inserting a plurality of columnar materials into one of the ends of the hollow fiber membrane bundle at least in a side of making the hollow part opened;

accommodating the hollow fiber membrane bundle which keeps a state of insertion in a vessel for forming an adhesively-fixed part; injecting an adhesive bond into the vessel and curing the adhesive bond;

then cutting an end face of the hollow fiber membrane bundle to form the adhesively-fixed part; and consequently making the columnar materials having a length of 0.3 to 0.9 times with reference to a thickness of the adhesively-fixed part exist at least in the adhesively-fixed part of the neighboring region (A).

10. A method for manufacturing the external pressure type hollow fiber membrane module according to claim 1, including:

accommodating the hollow fiber membrane bundle in the housing having the nozzle for allowing the fluid to enter and exit therefrom;

horizontally rotating the housing in a state of keeping the nozzle directing toward a lower direction than a horizontal direction;

injecting an adhesive bond into the housing under a centrifugal force; and curing the adhesive bond to form an adhesively-fixed part.

11. An external pressure type hollow fiber membrane module of an external pressure type having a membrane occupying rate set to between 0.3 to 0.6, comprising:

a cylindrical housing;

a hollow fiber membrane bundle formed of a plurality of hollow fiber membranes located inside of the cylindrical housing;

a nozzle for allowing a fluid to enter into and exit from the housing, located on a side wall of the cylindrical housing wherein the membrane bundle extends across the cylindrical housing and is separated in cross-section into two regions, a first region taking up at least one fourth of a cross-sectional area of the membrane bundle located between a portion of the wall of the cylinder that extends about the nozzle to approximately the center of the cylinder, and a second region that extends from the first region to the side of the wall of the cylinder that is opposite to the side of the wall in which the nozzle is located, wherein a ratio PB/PA of membrane-occupying rates is 0.50 or more but 0.95 or less when PA is defined as the membrane-occupying rate in the first region, and PB is defined as the membrane-occupying rate in the second region, wherein the membrane occupying rate in the housing is between 0.3 to 0.6; and wherein a partial portion of a circumference of the hollow fiber membrane bundle is within the first region, and the rest of the circumference of the hollow fiber membrane bundle is within the second region, the membrane-occupying rate at the partial portion of the circumference of the hollow fiber membrane bundle is higher than the membrane-occupying rate at the rest of the circumference of the hollow fiber membrane bundle, and the membrane-occupying rate at the rest of the circumference of the hollow fiber membrane bundle is not higher than the membrane-occupying rate at the center of the hollow fiber membrane bundle.

12. An external pressure type hollow fiber membrane module of an external pressure type having a membrane occupying rate set to between 0.3 to 0.6, comprising:

a rod-shaped bundle of hollow fiber membranes formed of a plurality of hollow fiber membranes, a cylindrical housing, and a nozzle for allowing a fluid to enter into and exit from the housing, the hollow fiber membranes being fixedly adhered to each other and to the inner wall of the housing at ends of the hollow fiber membrane bundle;

a hollow part opened in one side or both sides of adhesively-fixed ends of the hollow fiber membrane; and wherein the nozzle for allowing the fluid to enter and exit therefrom is installed on a side face of the housing of at least one adhesively-fixed end at which the hollow part is opened;

wherein the rod-shaped bundle of hollow fiber membranes extends across the cylindrical housing and has a neighboring region (A) having a cross-sectional area that surrounds the nozzle and extends from the nozzle approximately half way to a side of the cylindrical housing opposite to the nozzle, and a non-neighboring region (B) of the nozzle which has a cross-sectional area that encompasses a cross-sectional area of the cylindrical housing other than that cross-sectional area encompassed by the neighboring region (A), wherein the membrane occupying rate in the housing is between 0.3 and 0.6, and wherein a partial portion of a circumference of the rod-shaped bundle of hollow fiber membranes is within the neighboring region (A), and the rest of the circumference of the rod-shaped bundle of hollow fiber membranes is within the non-neighboring region (B), the membrane-occupying rate at the partial portion of the circumference of the rod-shaped bundle of hollow fiber membranes is higher than the membrane-occupying rate at the rest of the circumference of the rod-shaped bundle of hollow fiber membranes, and the membrane-occupying rate at the rest of the circumference of the rod-shaped bundle of hollow fiber membranes is not higher than the membrane-occupying rate at the center of the rod-shaped bundle of hollow fiber membranes.

* * * * *